(12) United States Patent
Ford

(10) Patent No.: US 6,412,812 B1
(45) Date of Patent: Jul. 2, 2002

(54) DRIVER SIDE AIR BAG MODULE

(75) Inventor: Brian C. Ford, Mt Clemens, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/801,986

(22) Filed: Mar. 8, 2001

(51) Int. Cl.[7] .......................... B60R 21/20; B60R 21/22
(52) U.S. Cl. .................. 280/731; 280/728.2; 280/728.3
(58) Field of Search ............................. 280/731, 728.3, 280/728.2, 732

(56) References Cited

U.S. PATENT DOCUMENTS

| 5,269,559 A | * 12/1993 | Filion et al. ............. 280/728.3 |
| 5,562,301 A | * 10/1996 | Lutz ........................ 280/728.2 |
| 5,685,560 A | * 11/1997 | Sugiyama et al. .......... 280/731 |
| 5,692,773 A | * 12/1997 | Ono ........................ 280/728.2 |
| 5,975,560 A | * 11/1999 | Fischer ..................... 280/728.2 |
| 6,149,184 A | * 11/2000 | Ennis et al. ............. 280/728.2 |
| 6,276,711 B1 | * 8/2001 | Kurz et al. ............. 280/728.2 |

FOREIGN PATENT DOCUMENTS

| JP | 04169356 A | * 6/1992 |
| JP | 10236258 A | * 9/1998 |

* cited by examiner

Primary Examiner—Lanna Mai
Assistant Examiner—Ruth Ilan
(74) Attorney, Agent, or Firm—Markell Seitzman

(57) ABSTRACT

An air bag module (20) including: an inflator (30); a cushion (26); a retainer ring (28); a cover (22) having a relatively flexible side wall (48a–d) with a pair of flaps (50a,50b) integrally formed and extending from opposing portions of the flexible side wall, each of the flaps including a plurality of apertures (60;62); a housing (24) having a bottom, and a side wall enveloping an end region of the cover side wall to reinforce the cover side wall; and a first plurality of fasteners (82) for engaging the inflator, retainer ring, the cushion (26) and cover flaps.

8 Claims, 7 Drawing Sheets

DRIVER SIDE AIR BAG MODULE

BACKGROUND AND SUMMARY OF THE INVENTION

The present invention relates to a driver's air bag module. More particularly, the invention is directed towards an air bag module with a housing that envelopes certain walls of a mating cover to reinforce the side walls of the cover. The housing is also adapted to be connected to a vehicle's steering wheel.

It is an object of the present invention to provide a driver side air bag module which does not use exotic fasteners or a snap fit connectors between the housing and portions of the cover. A further object of the invention to provide such a module which is easy to assemble.

Accordingly, the present invention comprises: an air bag module comprising: an inflator; a cushion; a retainer ring; a cover having a relatively flexible side wall with a pair of flaps integrally formed and extending from opposing portions of the flexible side wall, each of the flaps including a plurality of apertures; a housing having a bottom, and a side wall enveloping an end region of the cover side wall to reinforce the cover side wall; and a first plurality of fasteners for engaging the inflator, retainer ring, the cushion and cover flaps.

Many other objects and purposes of the invention will be clear from the following detailed description of the drawings.

DETAILED DESCRIPTION OF THE DRAWINGS

Figure 1:
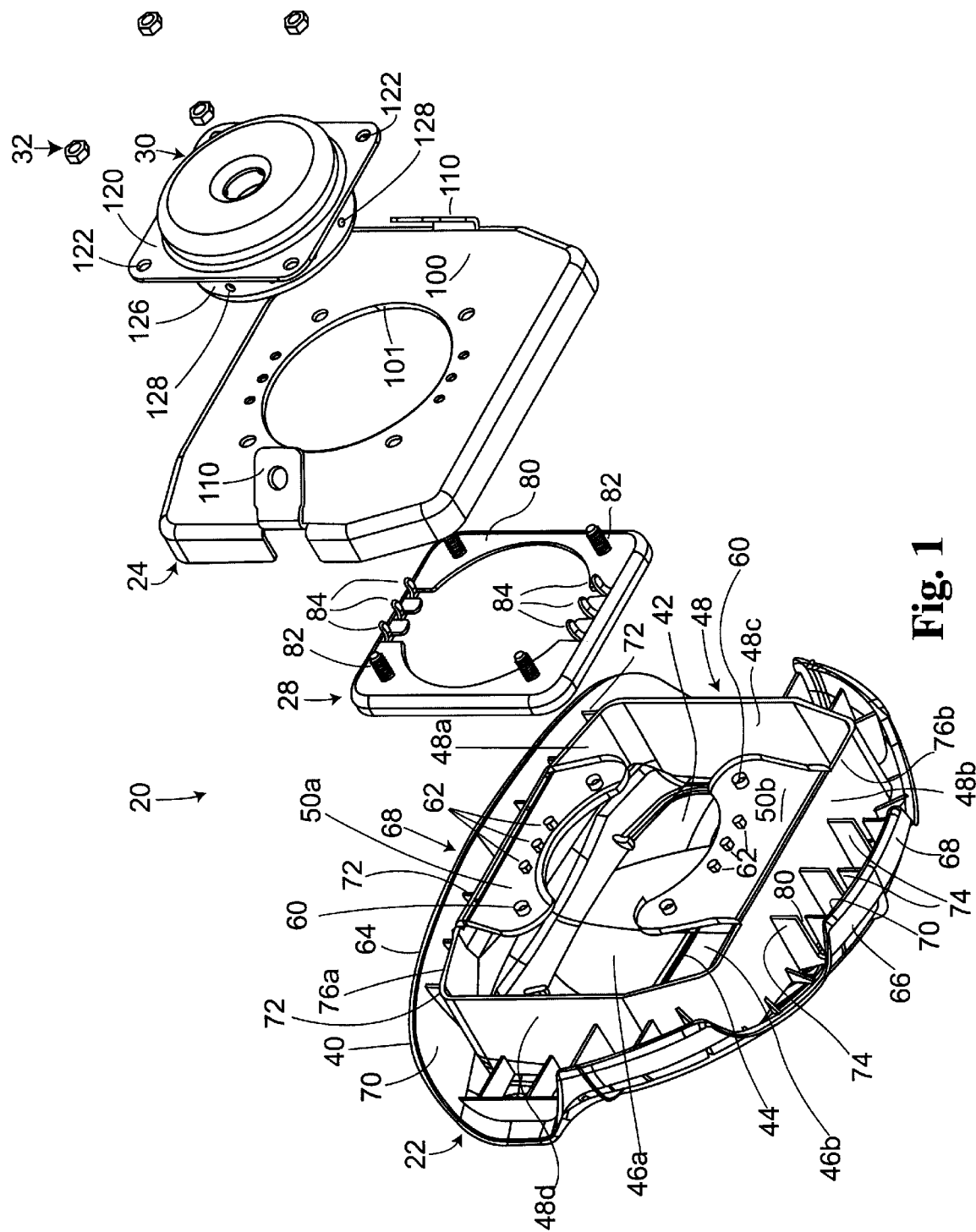
FIG. 1 is an exploded view of the components contained within the current invention, with the cushion removed for clarity.

Reference is made to in FIG. 1 which shows the major portions of the invention which comprises a driver side air bag module 20 comprising a cover 22, housing 24, cushion (or air bag) 26 (shown partially in FIG. 2), retaining ring 28, inflator 30, and fasteners such as nuts 32.

The cover 22 includes an outer surface 40 mounted facing the occupant (not shown) and an under, inner or rear surface 42 which includes a tear seam 44 which permits the cover to open as the cushion 26 inflates.

As is known in the art the cover will often separate into hinged flaps 46a, 46b along the tear seam in a known manner. Many tear seam configuration as known in the art can be used. The cover 22 additionally includes a side wall 48 which extends from the undersurface 42. As shown the side wall is generally rectangular in shape with four major side walls 48a–48d, but other configurations can be used. Walls 48a and 48b include respective integral flaps 50a and 50b. The cover is made of a molded elastomer and the flaps 50a and 50b extend inwardly from their respective side wall 48a, 48b and are generally orientated 90 degrees from these side walls (see FIG. 5). As shown the side walls 48a–48d extend generally perpendicular from the undersurface 42. Each flap 50a, 50b includes two stud receiving mounting holes 60 and a plurality of optional tab receiving openings 62 (as shown each flap includes three such openings 62).

As can be seen, the outer surface 40 of the cover curves downwardly at the top 64 and bottom 66 of the cover forming two overhangs 68. The inner surface 70 of each overhang 68 is spaced from a corresponding side wall such as 48a and 48b. To prevent the overhangs 68 from flexing a plurality of ribs 72 and 74 are integrally formed in the cover. The ribs 72 extend outwardly and terminate generally even with the end 76a of the wall 48a. The ribs 74 also extend outwardly but terminate below the end 76b of side wall 48b. Additionally, each rib 74 may include a slit 80 therein to make this portion of the cover 22 less stiff in this region as required for styling. As can be seen the width of the upper ribs 72 is smaller than the width of the lower ribs 74. It should be appreciated that the both sets of ribs 72 and 74 can be slotted or unslotted. Additionally, the end surface or each of the upper or lower ribs can terminate in line with the end 76a, b of its corresponding wall or spaced therefrom.

FIG. 1 shows the retaining ring 28 which comprises a metal or plastic member 80. The bottom 100 of the ring 28 includes a plurality of threaded studs 82 which can be pressed or welded to the ring 80. A plurality of tabs 84 are formed on opposing sides of the bottom and extend outwardly so that they can pass through the openings 62 in the flaps and through complementary openings 90 in the neck 92 of the air bag 26 as shown in FIG. 2.

The air bag includes an inflatable cushion or pillow portion (not shown in FIG. 2 but shown in FIG. 5) and the neck portion 92. The neck portion, in addition to the openings 90, includes a central opening 94 and four mounting openings 96. The retaining ring 28 is fit through the center opening 94 and manipulated from the inside of the air bag so that each fasteners 82 fits through a selected opening 96. If the tabs 84 are used they a placed so as to extend through a corresponding opening 90.

Figure 3:
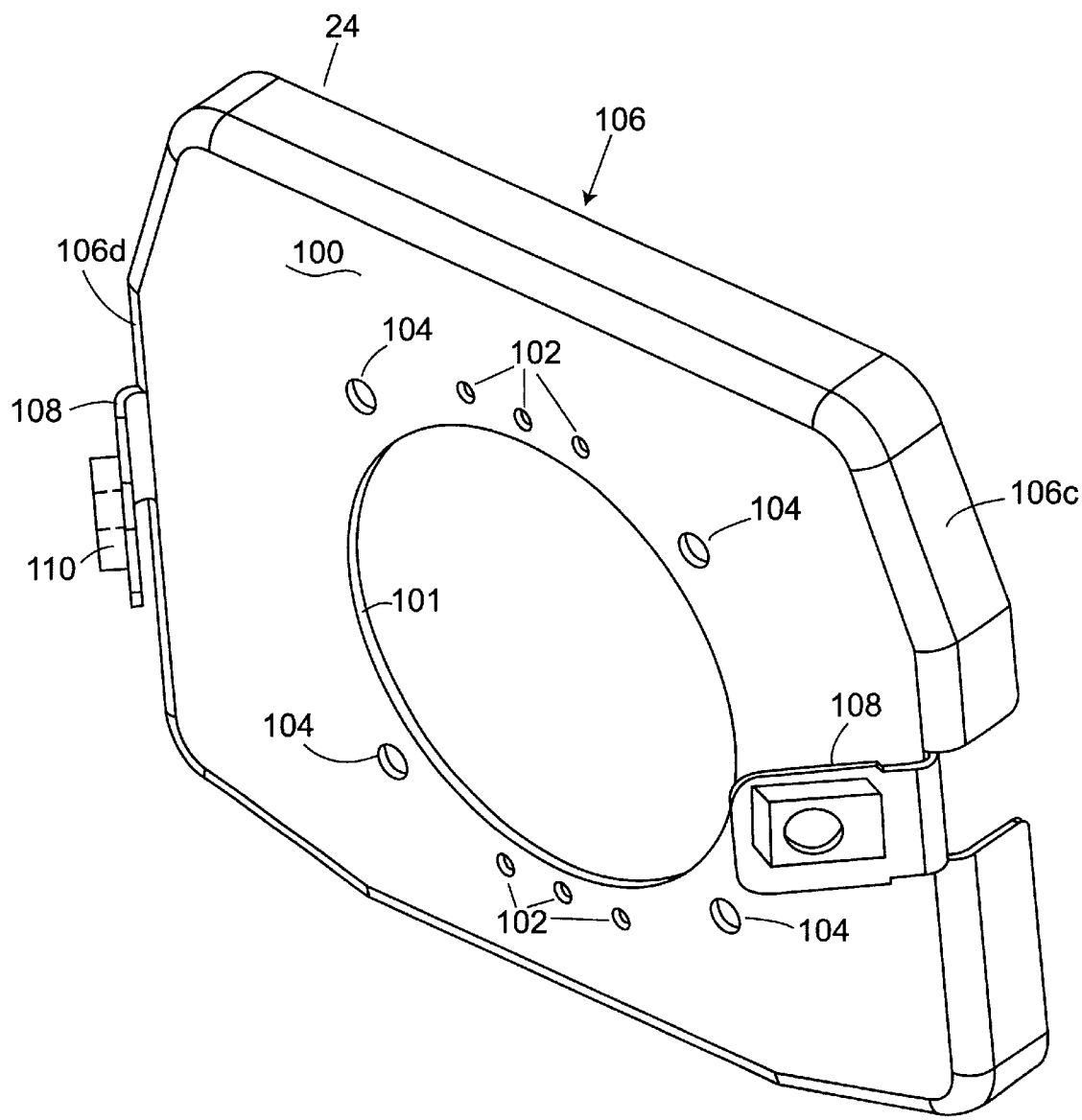
FIG. 3 is a bottom perspective view of a housing.
Figure 4:
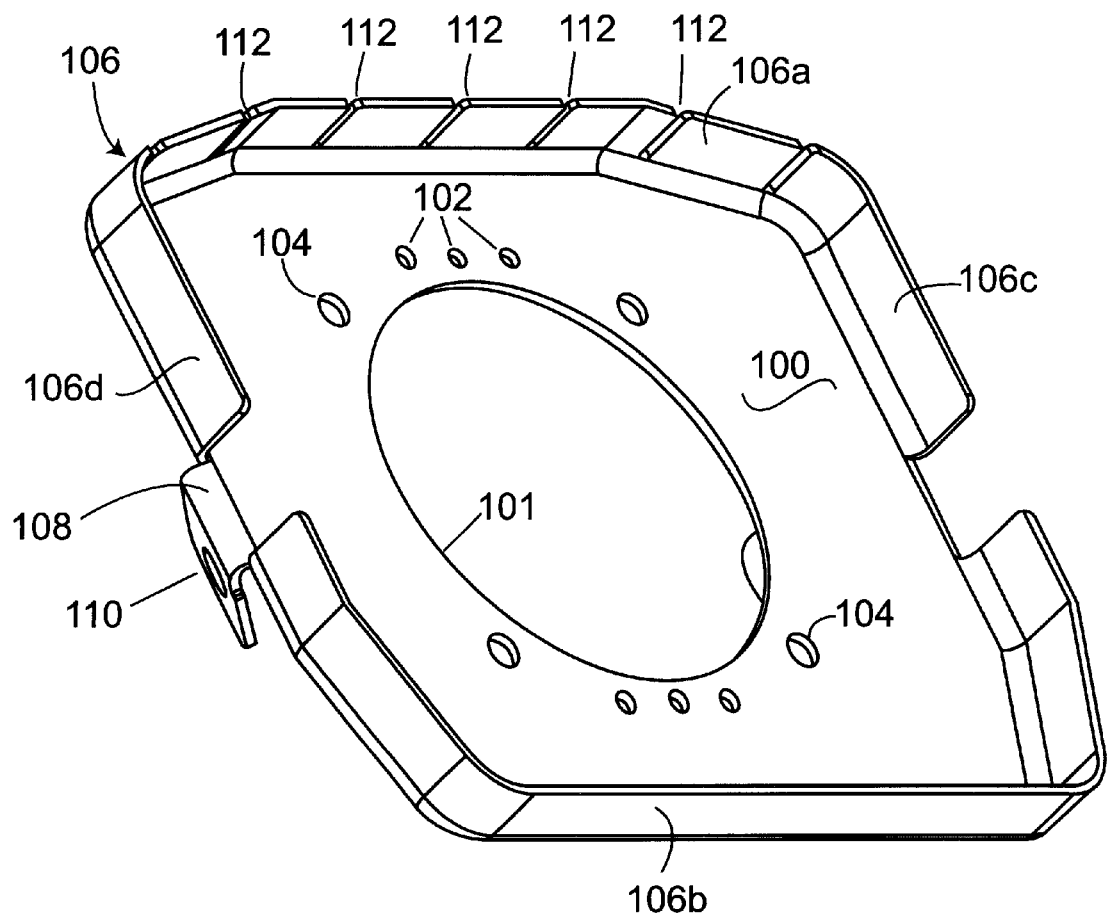
FIG. 4 is a top perspective view of a housing.

Reference is again made to FIG. 1 as well as to FIGS. 3 and 4 which illustrate various views of housing 24. The bottom 100 of the housing includes an opening 101 to receive the inflator 30 as well as a series of holes 102 for receiving the tabs 84 from the retaining ring 28. The housing also includes holes 104 for receiving the studs 82. The housing 24 includes a side or side wall 106 having four basic portions 106a–d which closely conform to the shape of the cover side wall. Sides 106c and 106d each include a bent-over tab 108 with a nut 110 pressed or welded onto it. The nut 110 has only been shown in FIG. 3. The nuts 110 allow receipt of a threaded fastener (not shown) which extends from a portion a steering wheel so that the housing can easily and quickly be secured to the steering wheel of the vehicle. Additionally, one of the side walls 106a includes a plurality of notches 112 which are equal in number to the ribs 72.

Figure 2:
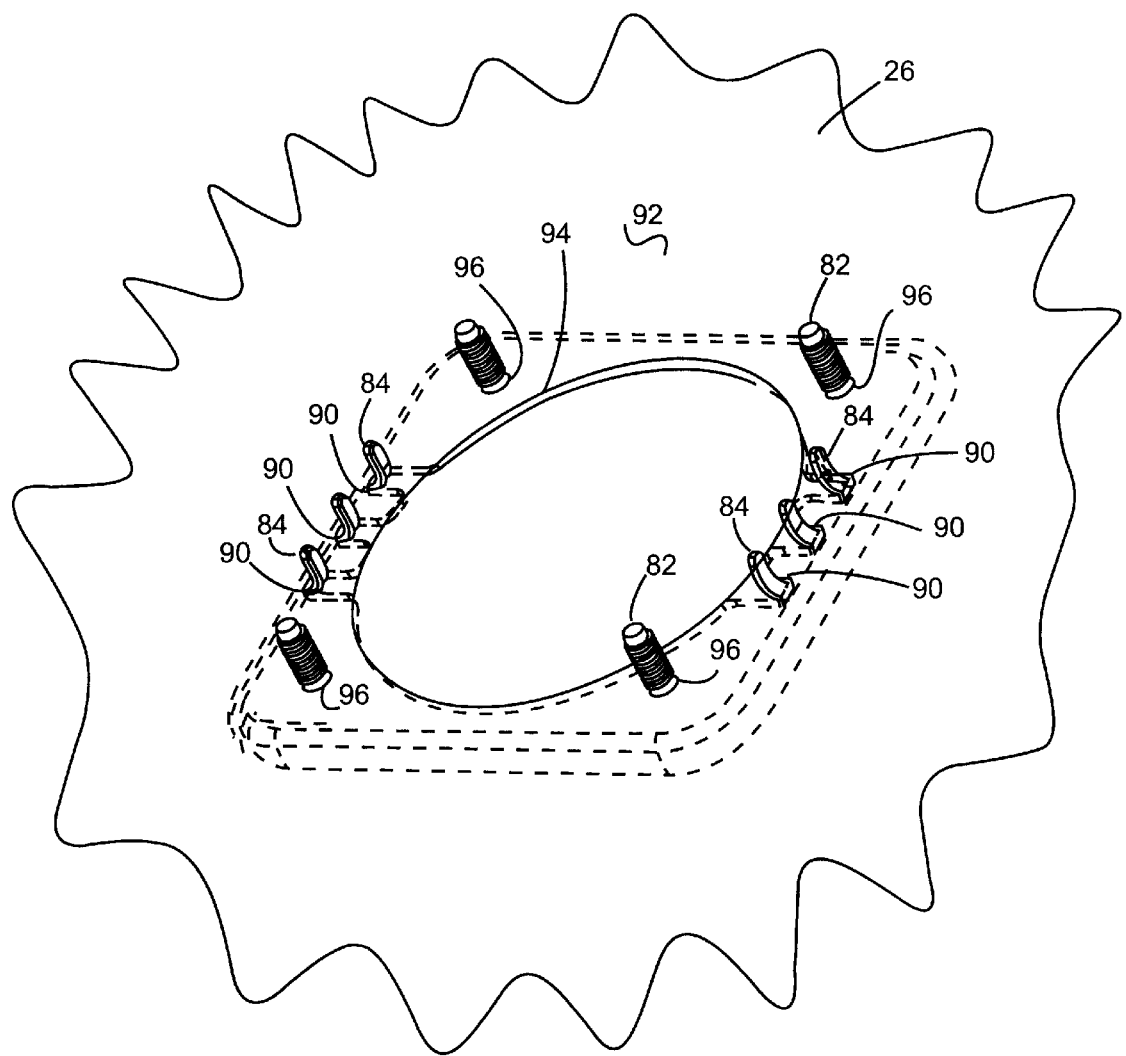
FIG. 2 is a perspective view of the retaining ring mounted within the air bag.
Figure 5:
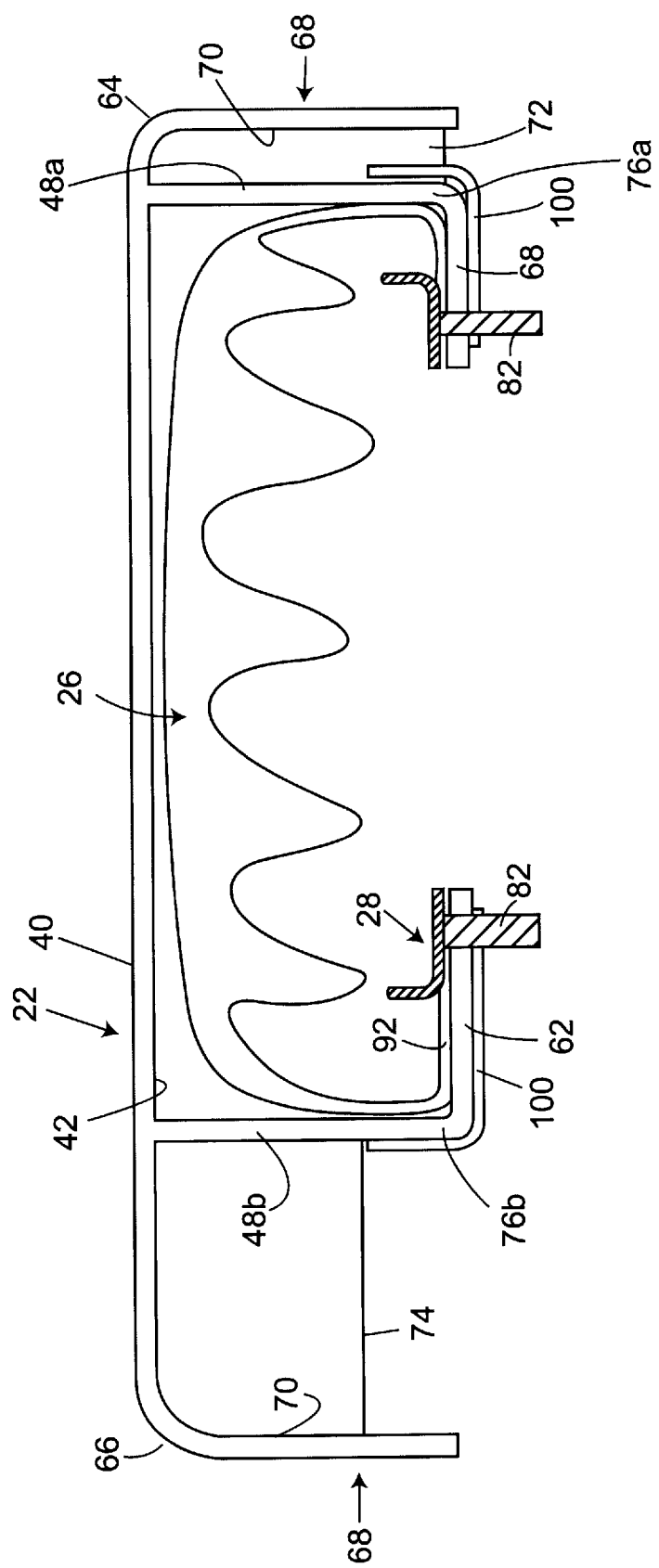
FIG. 5 is a cross-sectional view showing a folded air bag placed in a cover.
Figure 6:
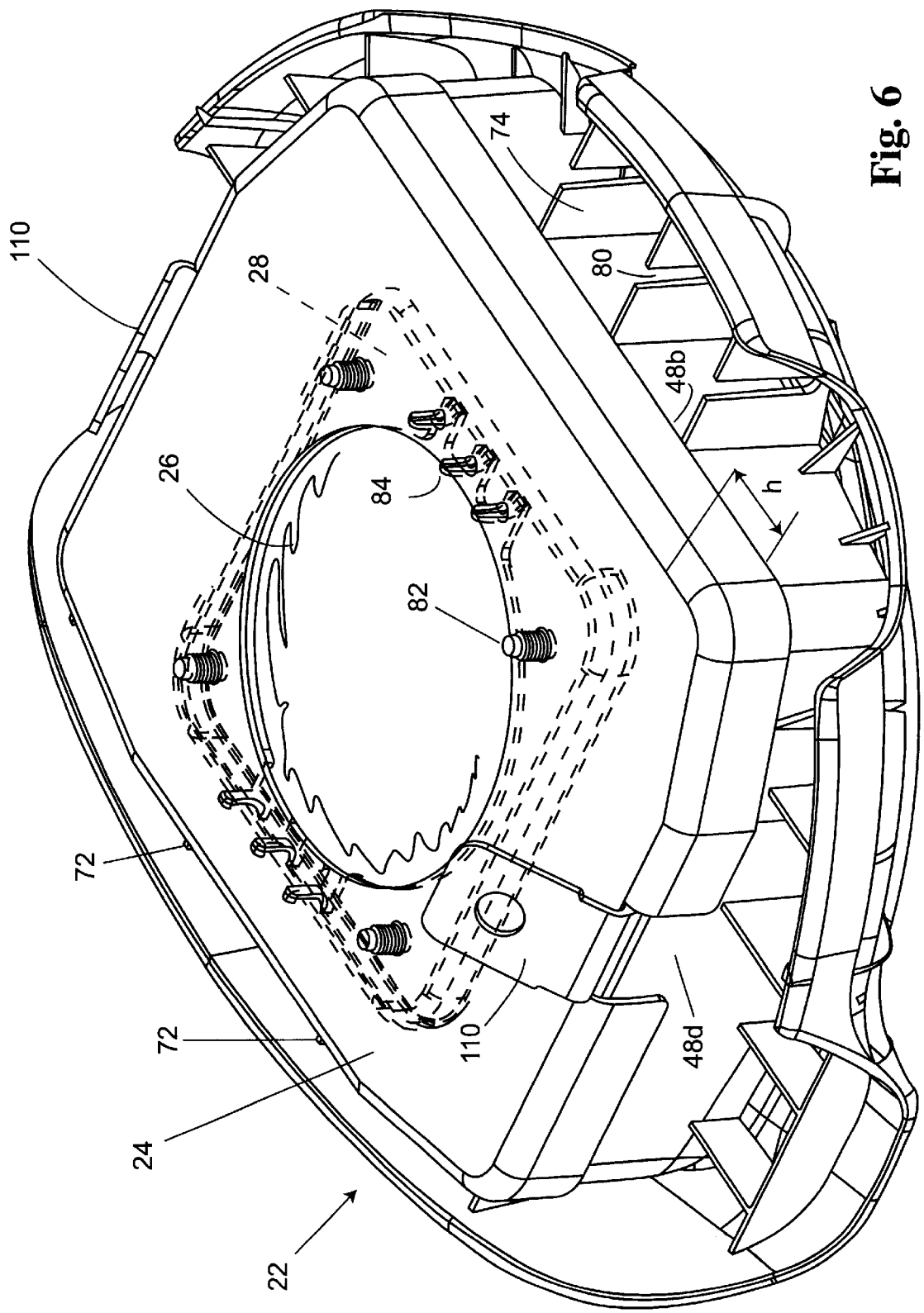
FIG. 6 is a perspective view showing the housing attached to the cover, with the air bag and retaining ring also installed.
Figure 7:
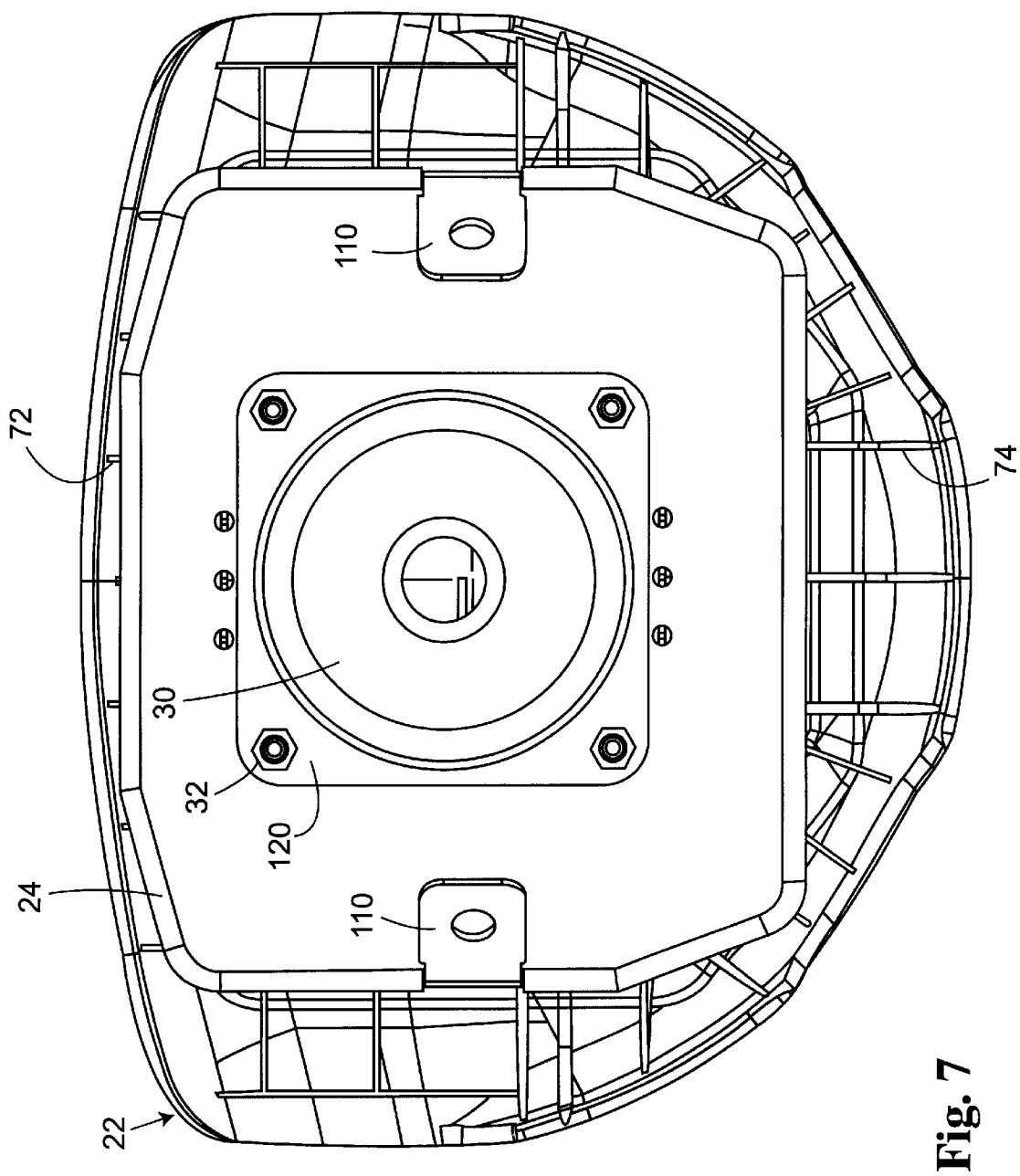
FIG. 7 is a rear perspective view showing the final assembly of the air bag module following installation of the inflator.

The assembly of the air bag module 20 begins by placing the retaining ring 28 into the air bag 26 as shown in FIG. 2. The air bag 26 is then folded in a known manner and the air bag and the retaining ring are placed into the cover 22 (see FIG. 5). The flaps 50a, 50b are manipulated so that the studs 82 and the tabs 84 enter a corresponding opening 60 and 62 in each flap 50a, 50b. Thereafter the housing 24 is installed onto the cover 22 which is shown in FIGS. 5 and 6. The side walls 106a–106d of the housing are closely fitted about the periphery of the side walls 48a–d of the cover. As can be seen the flaps are sandwiched between the retaining ring and the housing. This construction effectively increases the strength of the flaps since the loads encountered during deployment of the air bag module are spread out over the entire flap. Additionally, the side walls of the housing prevent the flaps from moving parallel to the bottom surface 100 of the housing 24, lessening the amount of load that must be carried by the holes 60 and 62 in the cover flap 50a–b. This close spacing reinforces the cover side walls and also permits the side walls to made, if desired, from a thin plastic (a thicker wall is not precluded) as support and structure are now provided by the housing. Also, as the reaction forces of the inflating air bag are absorbed by the flaps 50a, 50b which further illustrates that the side wall can be made appropriately thin. As previously mentioned side wall 106a of the housing includes a plurality of slots 112. With the housing mounted upon the cover the ribs 72 extends into a corresponding slot. The benefit is that it allows ribs to be installed between the walls and the outside of the cover, so as to increase the stiffness of the cover in the regions near the ribs. Also the housing side wall 106b when in place on the cover rests on the ends of the ribs 74, providing a solid stopping location to prevent the occupant of the vehicle from moving the cover (after it is installed on the steering wheel) with their hands. Thereafter the inflator 30 is mounted to the housing 24. As can be seen in FIG. 1 and 7 the inflator includes a flange 120 with a plurality of mounting holes to receive one of the fasteners 82. When the inflator is in place upon the housing its upper portion 126 extends though opening 101 and through the center of the retaining ring into the folded air bag. The inflator includes a plurality of exit ports 128 to channel inflation gas to the folded air bag. The inflator and housing are held in place by the fasteners 32 (see FIGS. 1 and 7)

During a deployment of the air bag module, inflation gas is generated by the inflator 30 to pressurize the air bag 26, which in turn places a load on the inner surface of the cover 22. When this load becomes sufficiently large, it causes the cover to open or tear along the tear seam 44 to allow the air bag to move towards and protect the occupant. This pressure inside the cushion and the momentum of the opening cover also cause a load to be placed on the cover flaps 50a, 50b near the stud holes 60. If this load is extremely large, it would be desirable to employ the alternate tabs 84 to distribute this load across the tabs. In addition, since the pressure in the air bag tends to push on the side walls 48a–d of the cover, it is possible that air bag 26 may be forced between the housing 24 and the flexible cover side walls. To counteract this risk, the side walls 106a–d of the housing 24 are made to extend for a distance, h, upwardly along the side walls 48a–d of the cover. In practice this distance h is about 10 mm or about 25% of the height of the cover side walls 48a–d.

Many changes and modifications in the above-described embodiment of the invention can, of course, be carried out without departing from the scope thereof. Accordingly, that scope is intended to be limited only by the scope of the appended claims.

What is claimed is:

1. An air bag module (20) comprising:

an inflator (30);

a cushion (26);

a cover (22) having a flexible side wall (48a–d );

a housing (24) having a bottom, and a side wall enveloping an end region of the cover side wall to reinforce the cover side wall; and wherein the cover (22) includes a plurality of ribs (72; 74) positioned on the outside of the cover side wall and wherein at least one of these ribs extends along the cover side wall past an adjoining upper edge of the housing side wall and where the side wall of the housing includes a slot (112) that receives the extending rib.

2. The air bag module as defined in claim 1 wherein the cover includes a pair of flaps (50a, 50b) integrally formed with and extending from opposing portions of the flexible side wall, each of the flaps including a plurality of apertures (60; 62).

3. The air bag module as defined in claim 1 wherein the cover further includes an overhang which is spaced from a section of the cover side wall and linked thereto by at least one of the plurality of ribs.

4. An air bag module (20) comprising;

an inflator (30);

a cushion (26);

a retaining ring (28);

a cover (22) having a flexible side wall (48a–d ) with a pair of flaps (50a, 50b) integrally formed with and extending from opposing portions of the flexible side wall, each of the flaps including a plurality of apertures (60; 62);

a housing (24); and a first plurality of fasteners (82) for engaging the inflator, retainer ring, the cushion (26) and cover flaps;

wherein the retaining ring includes a second plurality of fasteners integrally formed as part of the retaining ring operably engaged with each cover flap.

5. The air bag module as defined in claim 1, wherein each of the flaps includes complementary openings to receive the second plurality of fasteners.

6. The air bag module as defined in claim 4 wherein the flaps are sandwiched between the retaining ring and the housing.

7. The air bag module of claim 4 wherein the first plurality of fasteners includes a plurality of mounting studs extending from the retaining ring through the cushion bag, cover flaps, housing and a flange of the inflator.

8. The air bag module as defined in claim 4 wherein the housing has a bottom and includes a side wall attached to the bottom, the side wall enveloping an end region of the cover side wall to reinforce the cover side wall.

* * * * *